US006880655B2

United States Patent
Suwa et al.

(10) Patent No.: US 6,880,655 B2
(45) Date of Patent: Apr. 19, 2005

(54) AIR-INTAKE STRUCTURE AROUND FRONT GRILLE FOR VEHICLE

(75) Inventors: Takaki Suwa, Saitama (JP); Kojiro Okabe, Saitama (JP); Tatsuo Marushima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 9 days.

(21) Appl. No.: 10/218,482

(22) Filed: Aug. 15, 2002

(65) Prior Publication Data

US 2003/0042055 A1 Mar. 6, 2003

(30) Foreign Application Priority Data

Aug. 31, 2001 (JP) ..................................... P.2001-262885

(51) Int. Cl.[7] ............................................. B60K 13/02
(52) U.S. Cl. ................... 180/68.1; 180/68.3; 296/193.1
(58) Field of Search .............................. 180/68.1, 68.3, 180/68.4, 68.6; 296/193.09, 193.1, 203.02, 208

(56) References Cited

U.S. PATENT DOCUMENTS

| | | | | |
|---|---|---|---|---|
| 4,420,057 A | * | 12/1983 | Omote et al. .............. | 180/68.3 |
| 4,533,012 A | * | 8/1985 | Komoda ..................... | 180/68.3 |
| 4,610,326 A | * | 9/1986 | Kirchweger et al. ....... | 180/68.1 |
| 4,932,490 A | * | 6/1990 | Dewey ....................... | 180/68.3 |
| 5,660,243 A | * | 8/1997 | Anzalone et al. .......... | 180/68.1 |
| 6,302,228 B1 | * | 10/2001 | Cottereau et al. .......... | 180/68.1 |
| 6,347,823 B1 | * | 2/2002 | Ozawa et al. .......... | 296/193.09 |
| 6,390,217 B1 | * | 5/2002 | O'Brien et al. ............. | 180/68.6 |
| 6,578,650 B1 | * | 6/2003 | Ozawa et al. .............. | 180/68.1 |
| 6,626,483 B1 | * | 9/2003 | Ozawa et al. .............. | 180/68.1 |
| 2002/0096378 A1 | | 7/2002 | Kobayashi | |

FOREIGN PATENT DOCUMENTS

| | | |
|---|---|---|
| GB | 1166356 | 10/1969 |
| JP | 61181724 | 8/1986 |
| JP | 01-141129 | 6/1989 |
| JP | 05-032064 | 2/1993 |
| JP | 5-34019 | 5/1993 |
| JP | 07-004133 | 1/1995 |

* cited by examiner

Primary Examiner—Christopher P. Ellis
Assistant Examiner—Christopher Bottorff
(74) Attorney, Agent, or Firm—Armstrong, Kratz, Quintos, Hanson & Brooks, LLP

(57) ABSTRACT

An air-intake structure around a front grille for a vehicle in which an engine radiator is disposed at a front part of the body of a vehicle, and a front of the engine radiator is covered with the front grille. An air-intake port for an engine air-induction duct is disposed above the engine radiator. The air-intake port is offset to the left from a transverse center and is oriented toward the front grille. A closed portion is provided on the front grille which closes the entirety of a portion of the front grille which faces the air-intake port.

4 Claims, 8 Drawing Sheets

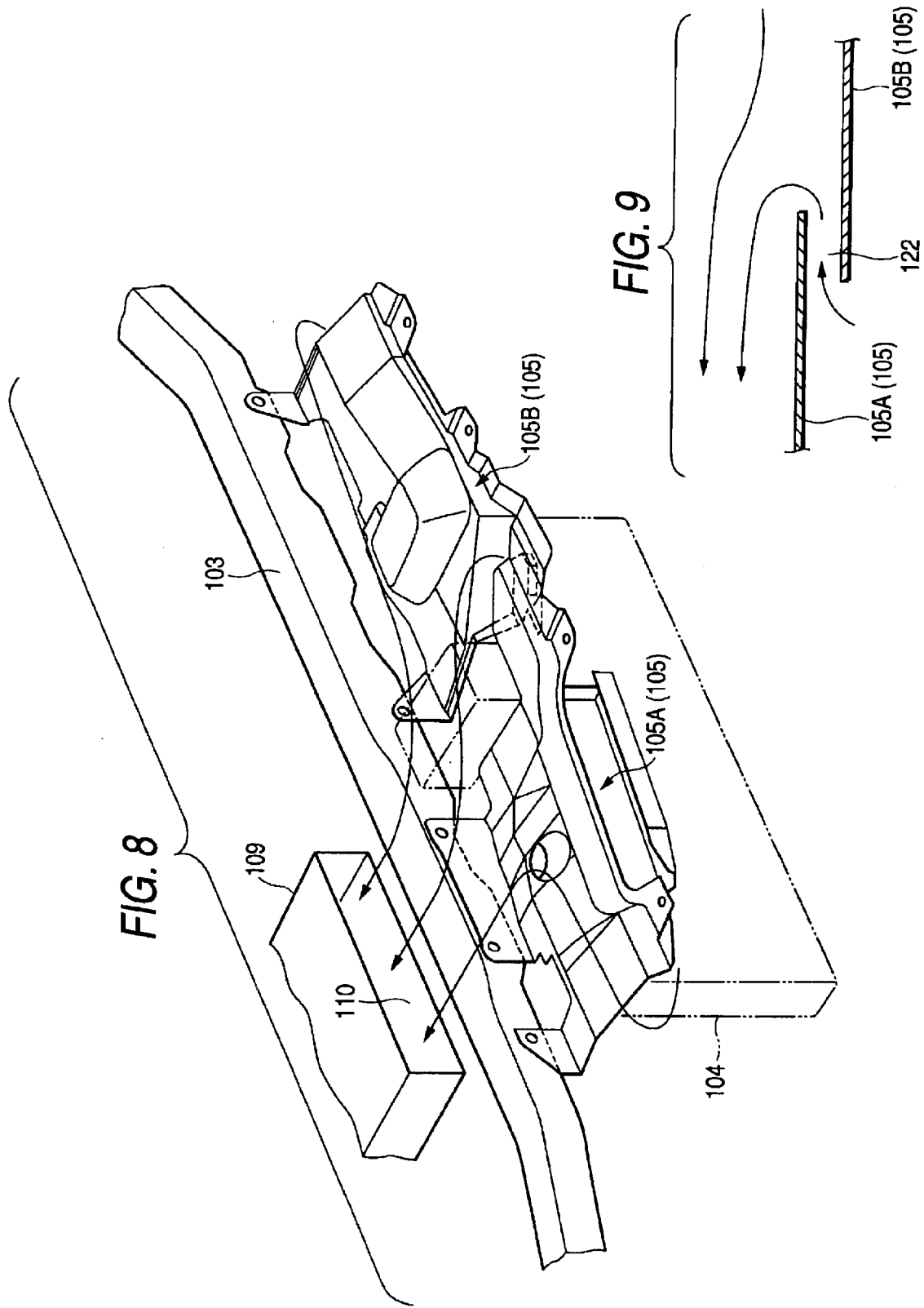

ically at a transverse center of the body so that a gap formed between the vertically overlapped portions of the units can serve as an air passage 122.

AIR-INTAKE STRUCTURE AROUND FRONT GRILLE FOR VEHICLE

BACKGROUND OF THE INVENTION

1. Field of the Invention

The present invention relates to an air-intake structure around a front grille for a vehicle.

2. Description of the Related Art

Various types of air-intake structures have been put into practice in which a running air taken through a front grille at the front part of a vehicle is inducted to an engine air cleaner through an intake air duct, and for example, an "Air-intake structure for an intake air duct for a vehicle" is known in JP-A-5-34019U (hereinafter, referred to as "prior art").

As shown in FIGS. 8 and 9, the prior art is constructed such that a shroud upper 103 as a cross member is provided at a front part of a vehicle body, a radiator 104 is disposed under the shroud upper 103, a transversely elongated horizontal seal board 105 is disposed just in front of the shroud upper 103, and an air-intake port 110 for an air-intake dust 109 for an engine is disposed just behind the shroud upper 103.

The seal board 105 is a member divided into two left and right units such as a seal board right-hand division unit 105A and a seal board left-hand division unit 105B, and end portions of the respective seal board right-hand division unit 105A and seal board left-hand division unit 105B are overlapped vertically at a transverse center of the body so that a gap formed between the vertically overlapped portions of the units can serve as an air passage 122.

An air flow (running air) taken through a grille portion which covers a front of the radiator 104 passes below the seal board 105, is redirected upwardly of the seal board 105 from left and right sides of the seal board 105 and the air passage 122 and flows from the air-intake port 110 to the air-induction duct 109. According to the prior art, an amount of air to be supplied to the engine can thus be secured and foreign matters such as water drips and dust which are mixed in the air flow can thus be separated from the air flow.

In the prior art, however, since the seal board right-hand division unit 105A and the seal board left-hand division unit 105B are constructed to be vertically overlapped at the end portions thereof, the number of components is increased and the structure becomes complicated.

SUMMARY OF THE INVENTION

Then, an object of the invention is to provide an air-intake structure which can secure an amount of running air taken through a front grille to an air-induction duct for an engine and separate foreign matters mixed in running air from the running air with a smaller number of components and a simple structure.

with a view to attaining the object, according to a first aspect of the invention, there is provided an air-intake structure for a vehicle, comprising:

a front grille covering a front of an engine radiator which is disposed at a front part of the vehicle;

an engine air-induction duct having an air-intake port disposed above the engine radiator, the air-intake port being offset from a transverse center of the vehicle in a traverse direction and oriented toward the front grille; and a closed portion provided on the front grille for closing an entirety of a portion of the front grille which faces the air-intake port.

Running air can be taken in through a front grille by running a vehicle. Since the entirety of the portion of the front grill which faces the air-intake port is closed, there is no case where running air enters the air-intake port directly from the front grille. Running are taken in from the remaining part of the front grill which is free of such a closed portion is redirected to enter the air-intake port. Thus, since the running air is designed to be taken into the air-intake port after having been redirected, it is possible to separate as many foreign matters such as raindrops mixed in the running air as possible from the running air. Moreover, since the passing resistance of the running air from the front grille to the air-intake port can be reduced to as low a level as possible, an amount of running air that should be taken into the air-induction duct for the engine can be secured.

Furthermore, the closed portion may be integrally provided on the front grille. Then, there is no need to provide additionally a member for redirecting the flow of running air. Consequently, the air-intake structure around the front grille for a vehicle can be made simple with a smaller number of components.

According to a second aspect of the invention, there is provided an air-intake structure around a front grille for a vehicle as set forth in the first aspect of the invention, wherein an air-induction space is provided for inducing running air taken through the front grille to the air-intake port, the air-induction space being surrounded by the closed portion, a lower cover between the engine radiator and the air-intake port, an upper cover above the air-intake port and a rear cover behind the air-intake port.

Since the front grille on which the closed portion is integrally provided, the lower cover, the upper cover and the rear cover only constitute the air-induction space, the space can be collapsed by a relatively small magnitude of load, and the collapsible amount is relatively large.

When a vehicle is brought into collision with a front obstacle the front grille and the covers can be deformed by collision energy. The collision energy can be absorbed by the deformation of the members to some extent and thereby can be relaxed. Consequently, not only can various types of equipment in the engine compartment be protected from the obstacle but also the impact to the obstacle can also be relaxed.

According to a third aspect of the invention, there is provided an air-intake structure around a front grille for a vehicle as set forth in the second aspect of the invention, wherein a face of the lower cover which faces the air-induction space is made to be an irregular face so that foreign matters such as rain water and dust which are mixed in running air can be separated from the running air at the irregular face.

Foreign matters such as rain water and dust which are mixed in the running air flowing to the transverse direction through the air-induction space can be separated at the irregular face. Consequently, the effect of separating the foreign matters mixed in the running air from the same running air can further be increased.

BRIEF DESCRIPTION OF THE DRAWINGS

FIG. 8 is a perspective view of an air-intake structure of the prior art; and

FIG. 9 is a sectional view showing an air flow between left and right seal board units of the prior art.

DETAILED DESCRIPTION OF THE PREFERRED EMBODIMENTS

Figure 1:
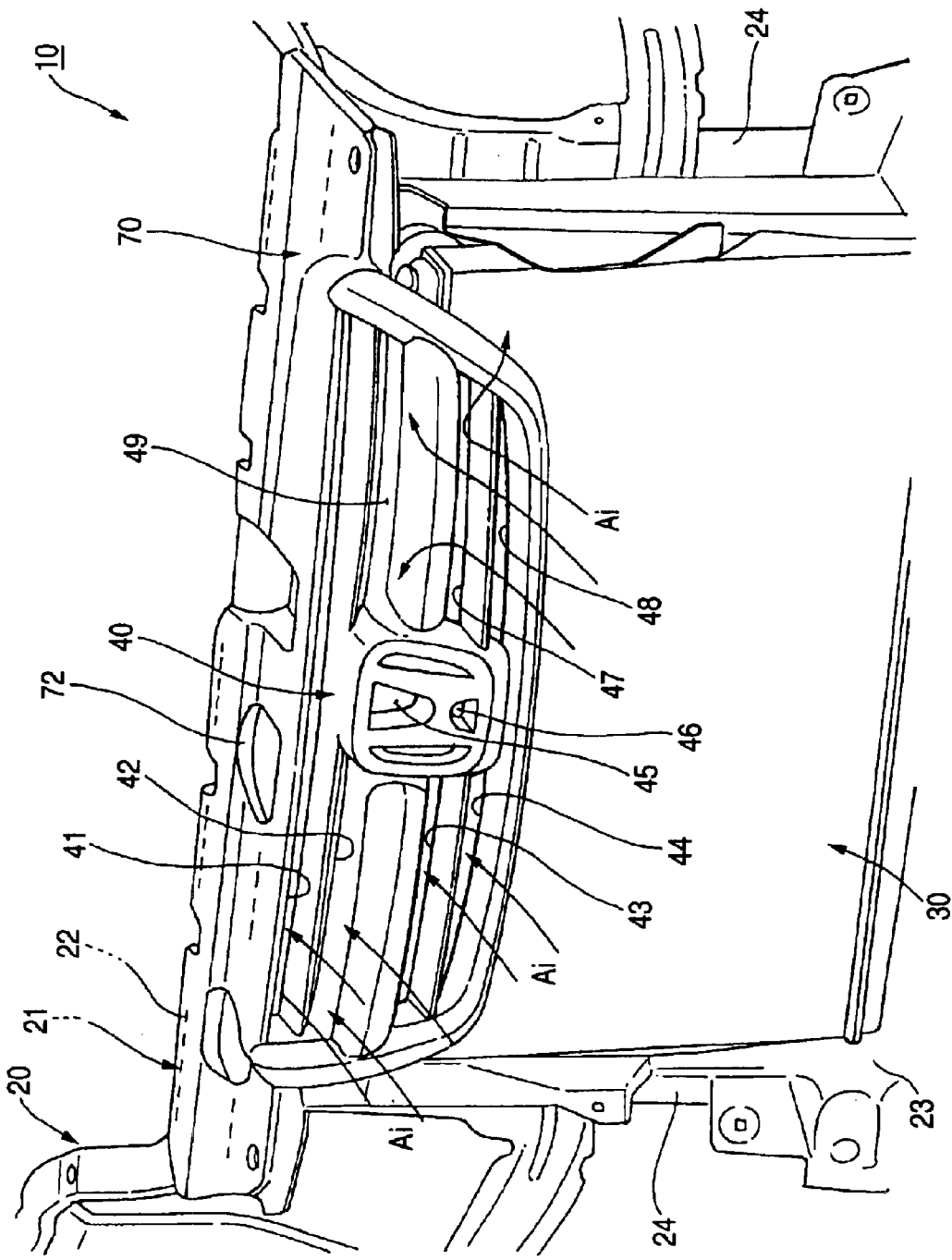
FIG. 1 is a perspective view (Part 1) of an air-intake structure around a front grille for a vehicle according to the invention.

An embodiment of the invention will be described below based on the accompanying drawings. Note that "front", "rear", "left", "right", "up" and "down" denote directions, respectively, as viewed from the driver, and the drawings are to be seen in a direction in which reference numerals are oriented.

FIG. 1 is a perspective view (Part 1) of an air-intake structure around a front grille for a vehicle according to the invention in which an engine radiator 30 is disposed at a front part of a vehicle 10 and at a transverse center of the vehicle 10, and a front of the radiator 30 is covered with a front grille 40, the perspective view representing a view of the structure as viewed from the front. The radiator 30 is disposed in front of a front bulkhead 21, and a running air produced when running the vehicle 10 is designed to be taken in from the front through the front grille 40.

The front bulkhead 21 is a front member of a body frame 20 and comprises an upper cross member 22 which extends in the transverse direction at front and upper portions thereof, a lower cross member 23 which extends in the transverse direction at front and lower portions thereof, and left and right side stays 24, 24 which extend between upper and lower cross members 22, 23.

Figure 2:
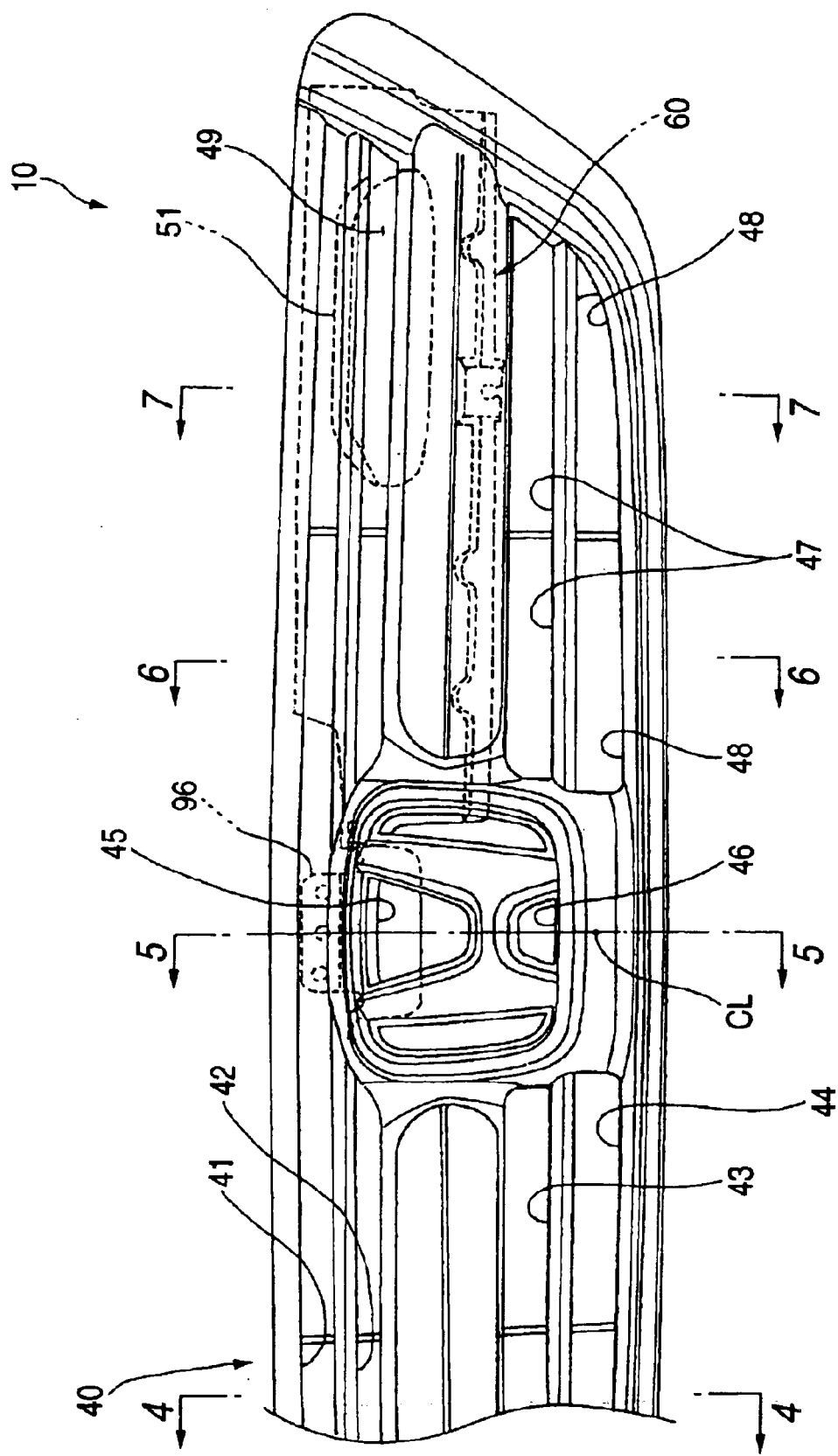
FIG. 2 is a front view of the air-intake structure around a front grille for a vehicle according to the invention.

FIG. 2 is a front view of the air-intake structure around a front grille for a vehicle according to the invention, in which upper and lower four air-induction ports (sequentially from the top, a first right air-induction port 41, a second right air-induction port 42, a third right air-induction port 43 and a fourth right air-induction port 44) are opened in a right-half side of the front grille 40 or a left side of the figure are, two upper and lower air-induction ports (sequentially from the top, a first central air-induction port 45 and a second center air-induction port 46) are opened at a transversely central position of the front grille, and two air-induction ports (sequentially from the top, a first left air-induction port 47 and in a second left air-induction port 48) are opened in a left lower half portion of the front grille or a right lower half portion in the figure.

A left upper half portion of the front grille 40 remains closed without opening no air-induction port, whereby the closed portion is made to be a closed portion 49. Thus, the invention is characterized by the provision of the closed portion 49 on the front grille 40.

Figure 3:
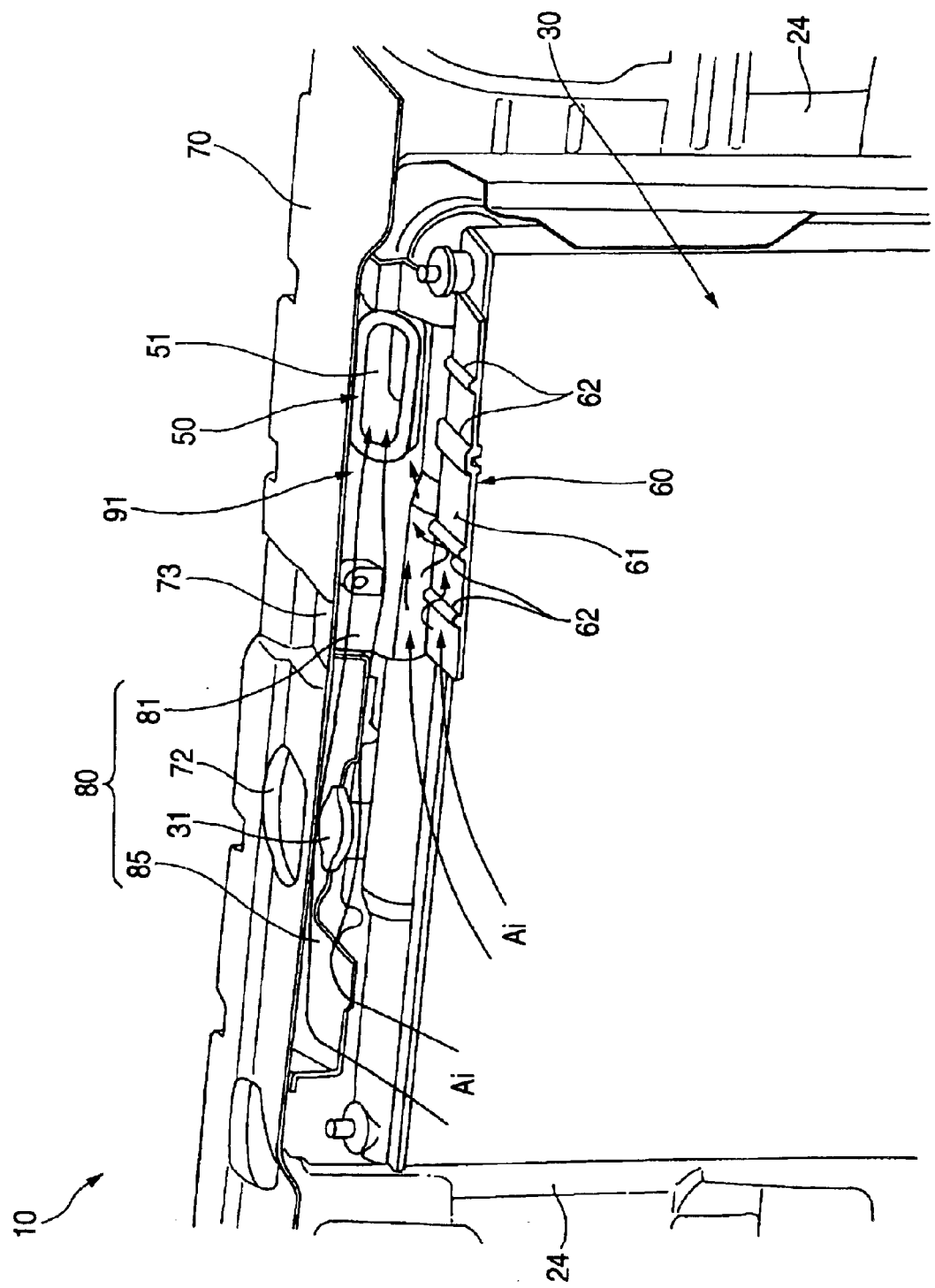
FIG. 3 is a perspective view (Part 2) of the air-intake structure around a front grille for a vehicle according to the invention.

FIG. 3 is a perspective view of the air-intake structure around a front grille for a vehicle according to the invention (Part 2), the figure being a view seen from the front with the front grille 40 (refer to FIG. 1) being removed. Furthermore, it is shown in the figure that an air-intake port 51 for an air-induction duct 50 for an engine is disposed above the radiator 30, the air-induction part 50 being offset to the left (right in the figure) from the transverse center and oriented toward the front grille 40 or the front.

The air-induction duct 50 is an air path for inducting running air Ai (outside air, air flow) taken in from the air-intake port 51 to an air cleaner, not shown, for the engine.

This air-intake structure is constructed such that a lower cover 60 is provided between the radiator 30 and the air-intake port 51, an upper cover 70 is provided above the air-intake port 51, and a rear cover 80 is provided behind the air-intake port 51.

The lower cover 60 is a short substantially horizontal flat plate which covers the top of a left-half portion (namely, a right-half portion in the figure) of the radiator 30 where the air-intake port 51 is situated when the radiator 30 is viewed from the front as shown in the figure. And, the lower cover 60 extends from the top of the radiator 30 toward the front grille 40 side under the air-intake port 51.

The upper cover 70 is a substantially horizontal elongate flat plate which covers above the radiator 30 and the air-intake port 51 entirely along the overall width direction and extends toward the front grille 40 above the air-intake port 51.

The rear cover 80 is constituted by a first rear cover 81 provided behind the lower cover 60 only to face the left-half portion of the radiator 30 as with the lower cover 60 and a second rear cover 85 provided adjacent to the right of the first rear cover 81 only to face the right-half portion of the radiator 30, the first and second rear covers being arranged in a transverse row.

In the figure, reference numeral 31 denotes a filler port for the radiator 30 and reference numerals 72, 73 denote inspection openings.

Here, reference is made back to FIG. 2 to continue the description. FIG. 2 shows that the closed portion 49 is provided where the entirety of the portion of the front grille 40 which faces the air-intake port 51 is totally closed. The front of the air-intake port 51 can be surrounded by the closed portion 49.

Figure 4:
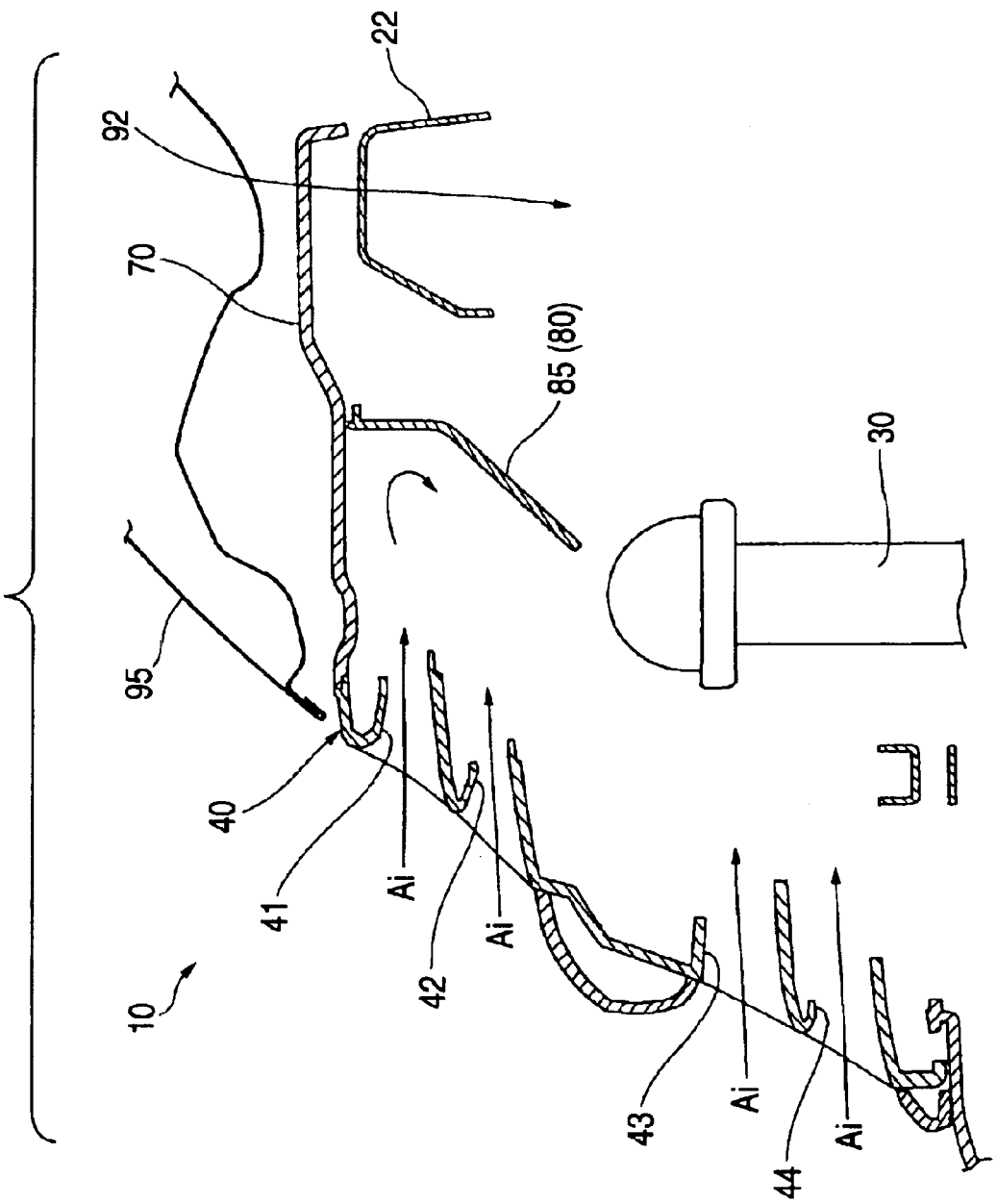
FIG. 4 is a sectional view taken along the line 4—4 in FIG. 2.

FIG. 4 is a sectional view taken along the line 4—4 in FIG. 2 and shows a longitudinal sectional structure of the right-half portion of an area surrounding the front grille 40.

The figure shows that the upper cover 70 extends forward from above the upper cross member 22, an upper end of the front grille 40 is removably connected through a fit to a front end of the upper cover 70. The second rear cover 85 extends toward an upper portion of the radiator 30 from an intermediate position along a longitudinal direction of the upper cover 70 in the vicinity of a lower face of the upper cover 70. The second rear cover 85 also plays a role of a heat shield cover for cutting off heat radiating from the engine, not shown. In the figure, reference numeral 95 denotes a hood.

Figure 5:
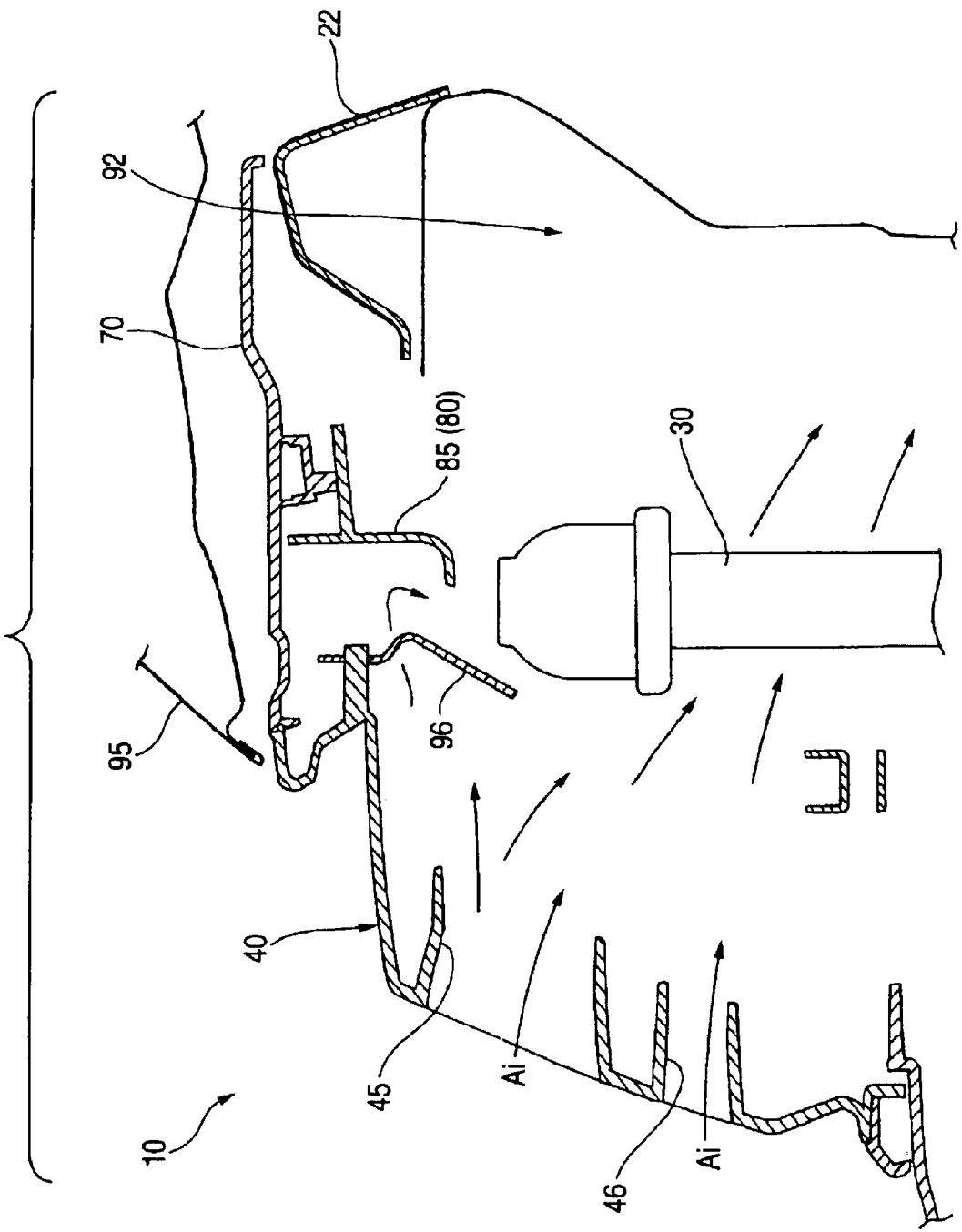
FIG. 5 is a sectional view taken along the line 5—5 in FIG. 2.

FIG. 5 is a sectional view taken along the line 5—5 in FIG. 2 and around the front grill 40 at a transverse center of the vehicle. The figure shows that this section has a structure similar to that of FIG. 4. In the figure, reference numeral 96 denotes a stay.

Figure 6:
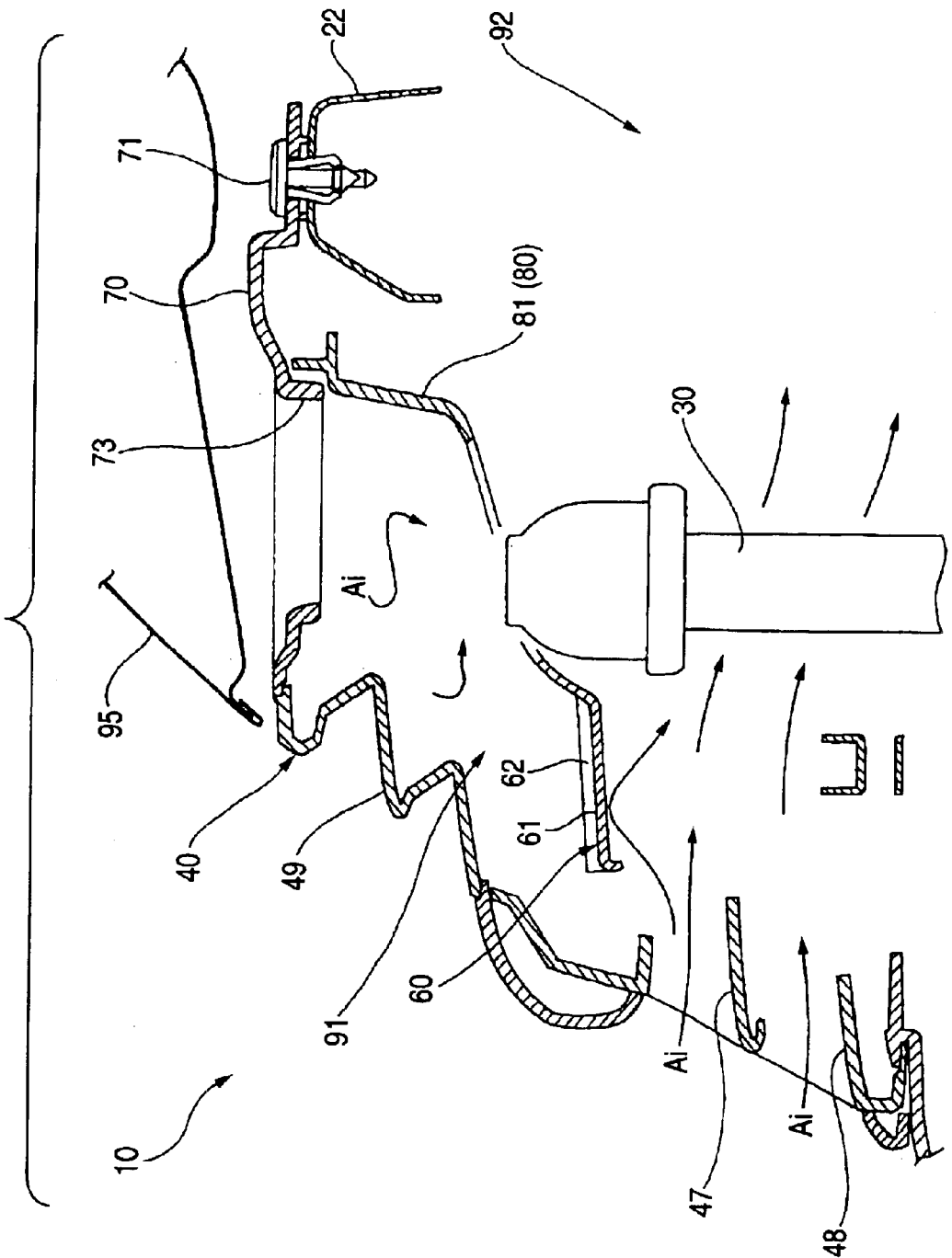
FIG. 6 is a sectional view taken along the line 6—6 in FIG. 2.

FIG. 6 is a sectional view taken along the line 6—6 in FIG. 2 and shows a longitudinal sectional structure of the left-half portion of an area surrounding the front grille 40. The figure shows that the upper cover 70 is removably attached onto the upper cross member 22 with a clip 71 and that a front end of the lower cover 60 extends to the vicinity of the back of the front grille 40. The front end of the lower cover 60 is situated higher than the first left air-induction port 47.

The lower cover 60 is an integrally formed article in which a lower end of the first rear cover 81 is formed integrally with a rear end of the lower cover 60. The first rear cover 81 extends upwardly rearward while covering the top of the radiator 30 and extends further to the vicinity of a lower face of the upper cover 70 at a longitudinally intermediate position thereof. The first rear cover 81 so constructed also serves as a heat shield cover for cutting off heat radiating from the engine, not shown.

Figure 7:
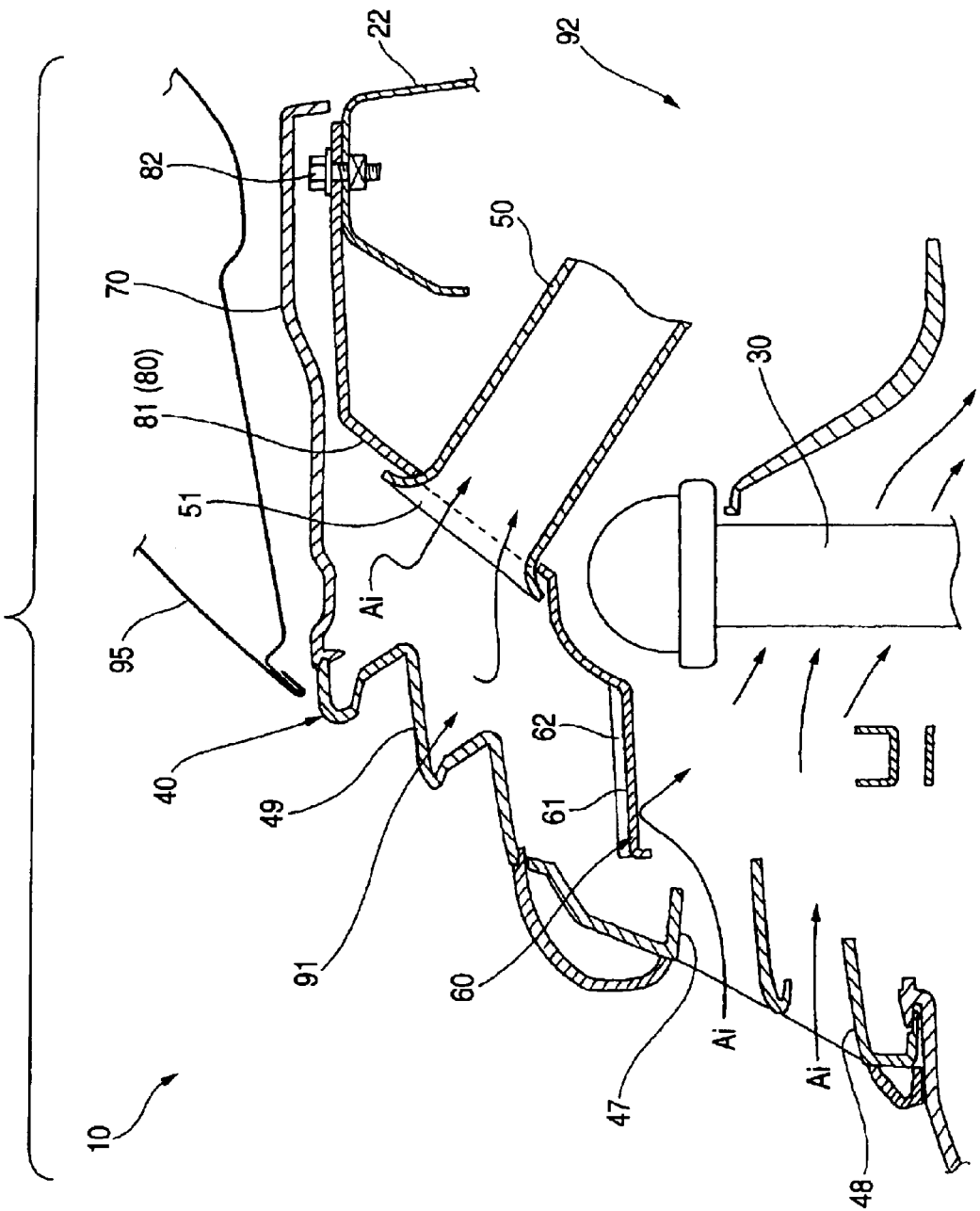
FIG. 7 is a sectional view taken along the line 7—7 in FIG. 2.

FIG. 7 is a sectional view taken along the line 7—7 in FIG. 2 and shows a longitudinal sectional structure of around the front grille 40 at a position where the air-intake port 51 is situated of the area.

The figure shows that the air-intake port 51 is disposed above the radiator 30 as has been described above, that the air-intake port 51 is oriented toward the front grille 40 and that the closed portion 49 is provided on the front grille 40 which closes the entirety of the portion thereof facing the air-intake port 51.

The first rear cover 81 extends to the top of the upper cross member 22 at an upper rear end thereof and is removably attached to the upper cross member 22 with a bolt 82.

The invention is characterized by the provision of an air-induction space 91 surrounded by the closed portion 49, the lover cover 60, the upper cover 70 and the first rear cover 81 (the rear cover 80) for inducting running air Ai taken through the front grille 40 into the air-intake port 51.

The front grille 40 integrally incorporating the closed portion 49 therein, the lower cover 60, the upper cover 70, the first rear cover 81 and the second rear cover 85 (refer to FIG. 4) are thin members and resin-formed articles of a polypropylene or the like and are relatively easy to deform.

Here, reference is made back to FIG. 3 to continue the description. FIG. 3 shows that a face 61 (an upper face 61) of the lower cover 60 which faces the air-induction space 91 is made to be an irregular surface so that foreign matters such as rain water and dust which are mixed in running air Ai are separated from the running air Ai at the irregular surface. To be specific, a plurality of longitudinally extending elongate projections 62 . . . are disposed on the upper face 61 of the lower cover 60 at regular intervals in the transverse direction. Thus, the upper face 61 of the lower cover 60 is formed into a wavy (corrugate) configuration in the transverse direction.

Described next based on FIGS. 1, 2, 3 and 7 will be the function of the air-intake structure around the front grille 40 which is constructed as has been described above.

In FIG. 1, running air Ai can be drawn in from the first, second, third and fourth right air-induction ports 41 to 44, the first and second central air-induction ports 45, 46 and the first and second left air-induction ports 47, 48 by running a vehicle 10. Since the entirety of the portion of the front grille 40 which faces the air-intake port 51 (refer to FIG. 2) is closed, there is no case where the running air Ai enters the air-intake port 51 directly from the front grille 40.

The running air Ai taken in from the first and second right air-induction ports 41, 42 and the first central air-induction port 45 (namely, the portions where the closed portion 49 does not exist) in the front grille 40 is inducted into an air-induction path surrounded by the top of the radiator 30, the upper cover 70 and the second rear cover 85 to be redirected to the left in the transverse direction and thereafter flows toward the air-intake port 51 side while being inducted along the air-induction space 91, as shown in FIG. 3.

The air-induction space 91 is a substantially closed space as viewed from the side which is surrounded by the closed portion 49, the lower cover 60, the upper cover 70 and the first rear cover 81, as shown in FIG. 7. Since the air-intake port 51 opens to the closed space, the running air Ai is redirected again to flow into the air-induction duct 50. As a result, the running air Ai flows toward the air cleaner for the engine, not shown.

Thus, since it is designed such that the running air Ai is redirected to be taken into the air-intake port 51, it is possible to separate as many foreign matters such as water drips as possible which are mixed in the running air Ai from the same running air. Moreover, since the passing resistance of the running air Ai from the front grille 40 to the air-intake port 51 can be reduced to as low a level as possible, an amount of air that is to be taken into the air-intake port 51 can be secured.

Furthermore, since the closed portion 49 is provided on the front grille 40 integrally, there is no need to provide an additional member for redirecting the flow of running air Ai. Consequently, the air-intake structure around the front grille 40 can be constructed simply with a smaller number of components.

In addition, since the air-intake port 51 is disposed above the radiator 30 and the air-intake port 51 is oriented toward the front grille, there is no case where warm air that has been used to cool the radiator 30 is taken in from the air-intake port 51. Consequently, since cool outside air can always be taken into the engine from the air-intake port 51, the performance of the engine can be exhibited sufficiently.

Furthermore, since the lower cover 60 is provided between the radiator 30 and the air-intake port 51, and the front end of the lower cover 60 is caused to extend to the vicinity of the back of the front grille 40 and is disposed to be situated higher than the first left air-induction port 47, there is no risk that foreign matters such as water drips, dust and mud which are floating in the running air Ai taken in from the first left air-induction port 47 enter the air-intake port 51.

In addition, as shown in FIG. 3, since the face 61 of the lower cover 60 which faces the air-induction space 91 is made to be the irregular surface, foreign matters such as rain water and dust which are mixed in the running air Ai which flows in the air-induction space 91 in the transverse direction can be separated from the running air Ai at the irregular surface. Consequently, the effect of separating the foreign matters mixed in the running air Ai can be increased further.

In addition, as shown in FIG. 7, the members constituting the air-induction space 91, namely, the front grille 40 integrally incorporating the closed portion 49 therein, the lower cover 60, the upper cover 70 and the first rear cover 81 and the second rear cover 85 (refer to FIG. 4) are relatively easy to deform.

Since the air-induction space 91 is constituted only by these members 40, 60, 70, 81, the members 40, 60, 70, 81 are those that can deform with a relatively small magnitude of load, and the deformable amount is relatively large.

When the vehicle 10 is brought into collision with a front obstacle, the members 40, 60, 70, 81 can be deformed by impact energy. The impact energy can be absorbed to some extent by the deformation and can then be relaxed. Consequently, various types of equipment within an engine compartment 92 can be protected against the obstacle and an impact imparted to the obstacle can also be relaxed.

Note that the air-intake port 51 may be offset to the right from the transverse center of the vehicle.

While only certain embodiments of the invention have been specifically described herein, it will apparent that numerous modifications may be made thereto without departing from the spirit and scope of the invention.

The invention constructed as has been described heretofore exhibits the following advantages.

According to the first aspect of the invention, there is no case where running air enters the air-intake port directly from the front grille since the air-intake port of the air-induction duct 50 for the engine is disposed above the radiator for the engine, the air-intake port is offset from the transverse center of the vehicle in a transverse direction and is oriented toward the front grille, and the closed portion is provided on the front grille which closes the entirety of the portion thereof which faces the air-intake port. Running air taken in from the remaining portions of the front grille which are free of such a closed portion is redirected to enter the air-intake port which is offset from the transverse center of the vehicle in a transverse direction. Thus, since it is designed such that the running air is redirected to enter the air-intake port, as many foreign matters such as water drips as possible which are mixed in the running air can be separated from the running air. Moreover, since the passing resistance of the running air flowing from the front grille to the air-intake port can be reduced to as low a level as possible, the amount of running air that is to be taken into the air-induction duct for the engine can be secured.

Furthermore, since the closed portion is provided integrally on the front grille as a single member, there is no need to provide an additional member for redirecting the flow of running air. Consequently, the air-intake structure around the front grille can be constructed simply with a smaller number of components.

According to the second aspect of the invention, the air-intake structure is characterized by the provision of the air-induction space which is surrounded by the closed portion, the lower cover disposed between the engine radiator and the air-intake port, the upper cover above the air-intake port and the rear cover behind the air-intake port, for inducting running air taken in through the front grille to the air-intake port.

Since the front grille integrally incorporating the closed portion therein, the lower cover, the upper cover and the rear cover only have to constitute the air-induction space, the members may be deformed with a relatively smaller magnitude of load, and the deformable amount is relatively large.

When the vehicle is brought into collision with a front obstacle the front grille and the bumper can be deformed by impact energy. The impact energy can be absorbed to some extent by the deformation and can then be relaxed. Consequently, various types of equipment within an engine compartment can be protected against the obstacle and an impact imparted to the obstacle can also be relaxed.

According to the third aspect of the invention, since the face of the lower cover which faces the air-induction space is made to be the irregular face, foreign matters such as rain water and dust which are mixed in the running air flowing in the transverse direction within the air-induction space can be separated from the running air at the irregular face. Consequently, the effect of separating foreign matters mixed in the running air can be increased further.

What is claimed is:

1. An air-intake structure for a vehicle, comprising:

a front grille covering a front of an engine radiator which is disposed at a front part of the vehicle;

an engine air-induction duct having an air-intake port disposed above the engine radiator, the air-intake port being offset from a transverse center of the vehicle in a traverse direction and oriented toward the front grille;

a closed portion provided on the front grille above the engine radiator for closing an entirety of a portion of the front grille which faces the air-intake port, the closed portion being integrally formed on the front grille as a single member, a lower cover disposed between the engine radiator and the air-intake port;

an upper cover disposed above the air-intake port; and a rear cover disposed behind the air-intake port, wherein an air-induction space surrounded by the closed portion, the lower cover, the upper cover and the rear cover is provided for inducing a running air taken through the front grille to the air-intake port, wherein the lower cover includes an irregular face which faces the air-induction space, the irregular face including a plurality of longitudinally extending elongate projections, so that foreign matters mixed in the running air are separated from the running air at the irregular face.

2. The air-intake structure for a vehicle according to claim 1, wherein the front grille has an air-induction port disposed below the closed portion, and a front end of the lower cover is extended to the vicinity of the front grille in such a manner as to be situated higher than the air-induction port.

3. The air-intake structure for a vehicle according to claim 1, wherein the lower cover is integrally formed with the rear cover.

4. The air-intake structure for a vehicle according to claim 1, further comprising an upper cross member which extends in a transverse direction at front and upper portions of the body frame, wherein the front grille, lower cover, upper cover and rear cover are formed of resin, and the upper cover and the rear cover are positioned in front of and attached to the upper cross member.

* * * * *